US007150863B2

(12) United States Patent
Alford et al.

(10) Patent No.: US 7,150,863 B2
(45) Date of Patent: Dec. 19, 2006

(54) POLYNUCLEAR AROMATIC HYDROCARBONS FOR FULLERENE SYNTHESIS IN FLAMES

(75) Inventors: J. Michael Alford, Lakewood, CO (US); Michael D. Diener, Denver, CO (US)

(73) Assignee: TDA Research, Inc., Wheat Ridge, CO (US)

( * ) Notice: Subject to any disclaimer, the term of this patent is extended or adjusted under 35 U.S.C. 154(b) by 317 days.

(21) Appl. No.: 10/099,095

(22) Filed: Mar. 15, 2002

(65) Prior Publication Data

US 2003/0049195 A1  Mar. 13, 2003

Related U.S. Application Data

(60) Provisional application No. 60/316,314, filed on Aug. 30, 2001.

(51) Int. Cl.
*C01B 31/00* (2006.01)
(52) U.S. Cl. .............................. 423/445 B; 423/445 R
(58) Field of Classification Search ............ 423/445 B, 423/445 R; 977/DIG. 1, 842, 843
See application file for complete search history.

(56) References Cited

U.S. PATENT DOCUMENTS

| | | | |
|---|---|---|---|
| 3,739,557 A | 6/1973 | Anderson et al. ............. 55/302 |
| 3,955,947 A | 5/1976 | Hoon et al. ................... 55/300 |
| 4,082,523 A | 4/1978 | Pausch ......................... 55/293 |
| 4,259,095 A | 3/1981 | Johnson, Jr. ................. 55/302 |
| 4,329,162 A | 5/1982 | Pitcher, Jr. .................... 55/523 |
| 4,673,349 A | 6/1987 | Abe et al. .................... 431/328 |
| 4,889,481 A | 12/1989 | Morris et al. ............... 431/328 |
| 5,227,038 A | 7/1993 | Smalley et al. ............. 204/173 |
| 5,273,729 A | 12/1993 | Howard et al. ............. 423/445 |
| 5,304,366 A | 4/1994 | Lorents et al. .......... 423/445 B |
| 5,316,636 A | 5/1994 | Bunshah et al. ........ 204/157.47 |
| 5,395,409 A | 3/1995 | Klimczak et al. ............. 55/302 |
| 5,470,222 A | 11/1995 | Holowczak et al. ........... 431/7 |
| 5,800,580 A | 9/1998 | Feldt ............................ 55/378 |
| 5,837,017 A | 11/1998 | Santschi et al. ............... 55/302 |
| 5,876,684 A | 3/1999 | Withers et al. ......... 423/445 B |
| 5,985,232 A | 11/1999 | Howard et al. .......... 423/447.3 |
| 6,162,411 A | 12/2000 | Howard et al. ......... 423/445 B |
| 6,806,397 B1 | 10/2004 | Reilly |

FOREIGN PATENT DOCUMENTS

| JP | 05-186209 | 7/1993 |
|---|---|---|
| JP | 6056414 A2 | 3/1994 |
| JP | 7138009 A2 | 5/1995 |

OTHER PUBLICATIONS

Dobbins et al. 'The Evolution of Soot PrecursorParticles in a Diffusion Flame' in Combustion and Flame vol. 115 pp. 285-298 (1998).*

Jenkins, G.M. et al. (1998), "Continuous Production of Fullerenes by Pyrolysis of Acetylene at a Glassy Carbon Surface," Carbon 36(12):1725-1727.

Bachmann et al. (1994), "The formation of $C_{60}$ and its precursors in naphthalene flames," Chem. Phys. Lett. 223:506-510.

Bogdanov, A.A. et al. (May 2000), "Development Prospects of the Commercial Production of Fullerenes," Tech. Phys. 45(5):521-527.

Curl et al. (Oct. 1991), "Fullerenes," Sci. Am. pp. 54-63.

Diederich et al. (1991), "The Higher Fullerenes: Isolation and Characterization of $C_{76}$, $C_{84}$, $C_{90}$, $C_{94}$, and $C_{70}O$, an Oxide of $D_{5h}$-$C_{70}$," Science 252:548-551.

Diener, M.D. et al. (Sep. 2000—web published), "Synthesis of Single-Walled Carbon Nanotubes in Flames," J. Phys. Chem. B 104:9615-9620.

Hebgen, P. and Howard, J.B. (1999), "Synthesis of Fullerenes in Low Pressure Benzene/Oxygen Diffusion Flames," Fifth Int'l Microgravity Combustion Workshop, K.R. Sachsteder and J.S. T'ien (eds.) NASA/CP 1999-208917, pp. 137-140.

Homann, K.-H. (1998), "Fullerenes and Soot Formation—New Pathways to Large Particles in Flames," Angew. Chem. Int. Ed. 37:2434-2451.

Howard et al. (1991), "Fullerenes $C_{60}$ and $C_{70}$ in flames," Nature 352:139-141.

Howard et al. (1992), "Production of $C_{60}$ and $C_{70}$ Fullerenes in Benzene-Oxygen Flames," J. Phys. Chem. 96:6657-6662.

Howard et al. (1992), "Fullerenes Synthesis in Combusion," Carbon 30:1183-1201.

Krätschmer et al. (1990), "Solid $C_{60}$: a new form of carbon," Nature 347:354-358.

McKinnon et al. (1992), "Combustion Synthesis of Fullerenes," Comb. Flame 88:102-112.

Taylor et al. (1993), "Formation of $C_{60}$ by pyrolysis of naphthalene," Nature 366:728-731.

Zhang et al. (1999), "Laser Ablation Mass Spectrometry of Pyrolyzed Koppers Coal-Tar Pitch: A Precursor for Fullerenes and Metallofullerenes," J. Phys. Chem. B 103:9450-9458.

Ahrens, J. et al. (1994), "Fullerenes and their ions in hydrocarbon flames," Int. J. Mass Spectrom. Ion Process. 138:133-148.

Anish, G. et al. (2002), Combustion synthesis of fullerenes and fullerenic nanostructures, Carbon 40:177-182.

(Continued)

*Primary Examiner*—Stuart Hendrickson
(74) *Attorney, Agent, or Firm*—Greenlee, Winner and Sullivan, P.C.

(57) ABSTRACT

This invention provides improved methods for combustion synthesis of carbon nanomaterials, including fullerenes, employing multiple-ring aromatic hydrocarbon fuels selected for high carbon conversion to extractable fullerenes. The multiple-ring aromatic hydrocarbon fuels include those that contain polynuclear aromatic hydrocarbons. More specifically, multiple-ring aromatic hydrocarbon fuels contain a substantial amount of indene, methylnapthalenes or mixtures thereof. Coal tar and petroleum distillate fractions provide low cost hydrocarbon fuels containing polynuclear aromatic hydrocarbons, including without limitation, indene, methylnapthalenes or mixtures thereof.

44 Claims, No Drawings

OTHER PUBLICATIONS

Hebgin, P. (Oct. 2000), "Combustion Synthesis of Fullerenes and Fullerenic Nanostructures," Extended Abstract, 3rd Int'l Conf. on Carbon Black, Oct. 25-26, 2000, available at web.met.edu/anish/www/JBH-abstract.pdf (last modified Dec. 10, 2001).

Hebgen, P. et al. (2000), "Synthesis of Fullerenes and Fullerenic Nanostructures in a Low-Pressure Benzene/Oxygen Diffusion Flame," Proc. Combust. Inst. 28:1397-1404.

* cited by examiner

POLYNUCLEAR AROMATIC HYDROCARBONS FOR FULLERENE SYNTHESIS IN FLAMES

CROSS-REFERENCE TO RELATED APPLICATIONS

This application takes priority under 35 U.S. C 119(e) from U.S. provisional application 60/316,314 filed Aug. 30, 2001, which application is incorporated by reference herein to the extent that it is not inconsistent with this disclosure.

STATEMENT REGARDING FEDERALLY SPONSORED RESEARCH OR DEVELOPMENT

This invention was made with funding from the United States government through the U.S. Department of Energy PETC under contract DE-FG03-98ER82692. The United States government has certain rights in this invention.

BACKGROUND OF THE INVENTION

Fullerenes are closed cage carbon compounds containing both six- and five-member carbon rings (See: Curl et al. (1991) *Sci. Am.* October, p. 54–63; Kratschmer et al. (1990) Nature 347:354–358; Diederich et al. (1991) Science 252: 548–551). Fullerenes have a wide-range of potential commercial applications in fields ranging from use as pharmaceuticals and cosmetic additives to use as additives in electron- and photo-resists, proton-conducting membranes for fuel cells, optical limiting materials and devices, lithium battery anodes, active elements in organic transistors, and as pigments.

The term "carbon nanomaterials" is used generally herein to refer to any substantially carbon material containing six-membered rings that exhibits curving of the graphite planes, generally by including five-membered rings amongst the hexagons formed by the positions of the carbon atoms, and has at least one dimension on the order of nanometers. Examples of carbon nanomaterials include, but are not limited to, fullerenes, single-walled carbon nanotubes (SWNTs), multiple-walled carbon nanotubes (MWNTs), nanotubules, and nested carbon structures with dimensions on the order of nanometers. The term "fullerene" is used generally herein to refer to any closed cage carbon compound containing both six-and five-member carbon rings independent of size and is intended to include the abundant lower molecular weight $C_{60}$ and $C_{70}$ fullerenes, larger known fullerenes including $C_{76}$, $C_{78}$, $C_{84}$ and higher molecular weight fullerenes $C_{2N}$ where N is 50 or more. The term is intended to include "solvent extractable fullerenes" as that term is understood in the art (generally including the lower molecular weight fullerenes that are soluble in toluene or xylene) and to include higher molecular weight fullerenes that cannot be extracted, including giant fullerenes which can be at least as large as $C_{400}$. Carbon nanomaterials may be produced in soot and, in certain cases, carbon nanomaterials may be isolated from the soot or enriched in the soot. Soot produced during the synthesis of carbon nanomaterials, such as fullerenes, typically contains a mixture of carbon nanomaterials which is a source for further purification or enrichment of carbon nanomaterials or which may itself exhibit desired properties of carbon nanomaterials and be useful as an addition to convey those properties. The term "carbon nanomaterials," when used without limitation, is intended to include soot containing detectable amounts of carbon nanomaterials. For example, the term "fullerenic soot" is used in the art to refer to soot containing fullerenes. Fullerenic soot is encompassed by the term carbon nanomaterials.

At present, the cost of production of fullerenes is generally too high for their economic use in commercial applications. In view of the considerable body of potential applications of these materials, there is a significant need in the art for lower-cost methods for production of fullerenes and other carbon nanomaterials.

This invention relates generally to the development of low-cost methods for the production of fullerenes and other carbon nanomaterials and, in particular, focuses on the identification of low-cost carbon feedstocks which provide higher yields of such products or higher carbon conversion rates to such products.

Methods are known in the art for production of fullerenes in electric arcs (U.S. Pat. Nos. 5,227,038 and 5,876,684), by electric beam evaporation (U.S. Pat. No. 5,316,636) and combustion in flames (e.g., sooting flames) (U.S. Pat. Nos. 5,273,729; 5,985,232 and 6,162,411; Howard et al. (1991) Nature 352:139–141; Howard et al. (1992) *J Phys. Chem.* 96:6657; Howard et al. (1992) *Carbon* 30:1183; McKinnon et al. (1992) *Comb. Flame* 88:102).

Unsaturated hydrocarbon fuels, typically those containing benzene and acetylene, have been used for combustion synthesis of fullerenes. The fullerene yield from acetylene is very poor (Howard et al. (1992) Carbon 30:1183). The yield from benzene in a premixed flame at low pressure (ca. 35 Torr) under strongly sooting conditions is about 0.5% conversion of benzene carbon to carbon of solvent extractable fullerenes.

The detection of fullerenes on combustion of naphthalene was reported by Bachmann et al. (1994) Chem. Phys. Lett. 223:506–510. In this study, fullerene concentration was reported to be higher in certain parts of the naphthalene flame than in a benzene flame, but no yield increase was established because soot was not recovered from the naphthalene flame.

Taylor et al. (1993) Nature 366:728–731 reported the formation of $C_{60}$ by pyrolysis of naphthalene at about 1,000° C. The fullerene yield from this process was reported to be<0.5% based on naphthalene consumed and was said to be "variable." Further, fullerenes were not detected in naphthalene pyrolysis at lower temperatures (about 500° C.).

Zhang et al. (1999) J. Phys. Chem. B v. 103 p. 9450–9454 reports detection of fullerene ions by laser ablation mass spectrometry of pyrolyzed Koppers coal-tar pitch. The coal-tar pitch described as consisting mainly of polycyclic aromatic hydrocarbons (PAHs) was pyrolyzed under a helium flow for 1 h at temperatures between 200–600° C. to generate a solid. Fullerene ions (e.g., $C_{60}^+$) were detected when samples of the pyrolyzed solid residue were vaporized using laser ablation.

U.S. Pat. Nos. 5,985,232 and 6,162,411 both relate to the production of fullerenic soot in flames with emphasis on the production of "fullerenic nanostructures" or "fullerenic carbon sheets." The fuel employed is termed "unsaturated hydrocarbons." This term relates particularly to benzene and acetylene, but is also defined in the patents to include, without limitation, "ethylene, toluene, propylene, butylene, naphthalene or other polycyclic aromatic hydrocarbons such as, in particular, petroleum, heavy oil, and tar" as well as "products derived from coal, kerogen and biomass which are primarily hydrocarbon, but also contain some amounts of nitrogen, sulfur, oxygen and other elements." These patents, however, do not teach or suggest that the use of naphthalene, any other polycyclic aromatic hydrocarbons, or any particular product of coal or petroleum will result in any significant improvement in fullerene production.

SUMMARY OF THE INVENTION

The present invention relates to the development of low-cost combustion methods for the synthesis of fullerenes and other carbon nanomaterials. In particular, the invention relates to the identification of hydrocarbon feedstocks (i.e., hydrocarbon fuels) for the synthesis of fullerenes and other carbon nanomaterials by combustion that provide carbon conversion rates that are significantly higher than those currently being obtained using benzene as the primary fuel component.

The invention more specifically relates to hydrocarbon fuels which contain at least one multiple-ring aromatic hydrocarbon component for fullerene and fullerenic soot synthesis by combustion. The multiple-ring aromatic hydrocarbon fuels of this invention comprise one or more aromatic molecules that contain two or more rings, one or more of which is an aromatic ring. Aromatic molecules include those having two or more rings, only one of which is aromatic, and those having two or more aromatic rings in combination with one or more rings that are not aromatic. Preferred multiple-ring aromatic hydrocarbon fuels comprise a substantial amount (i.e., about 30% or more by weight) of one or more aromatic molecules having two or more six-member rings, two or more five-member rings or a mixture of one or more six-member rings and one or more five-member rings.

More preferred multiple-ring aromatic hydrocarbon fuels comprise 40% or more by weight or 50% or more by weight of one or more aromatic molecules having two or more six-member rings, two or more five-member rings or a mixture of one or more six-member rings and one or more five-member rings. Of particular interest are multiple-ring aromatic hydrocarbon fuels that contain a substantial amount of components having two or more rings where at least one ring is a six-member aromatic ring and at least one other ring is a five-member ring which may be aromatic, unsaturated or saturated. Aromatic rings, unsaturated and saturated rings of the fuels of this invention can be all carbon rings or may contain one or two non-carbon atoms (i.e., they may be heterocyclic rings).

Multiple-ring aromatic hydrocarbon fuels of this invention include those which contain a substantial amount of polynuclear aromatic hydrocarbons (PAHs). Preferred components in such fuels are indene and methylnaphthalenes with indene being a more preferred component. Preferred fuels include those in which these preferred components are present at about 30% or more by combined weight and those in which they are combined with each other or one or more other aromatic molecules having one, two or three rings.

Multiple-ring aromatic hydrocarbon fuels of this invention include those in which indene or one or more methylnaphthalenes are combined with any one or more of benzene, toluene, xylene, naphthalene, anthracene, phenanthrene, pyrene, fluorene, indan, chrysene, or creosols. Combinations of indene and one or more methylnaphthalenes are also preferred. More preferred multiple-ring aromatic hydrocarbon fuels are those containing 40% or more by weight of indene and those containing 50% or more of indene. More preferred multiple-aromatic ring hydrocarbon fuels contain 40% or more by weight of indene, but less than about 20% by total weight of benzene, toluene and/or xylene.

Multiple-ring aromatic hydrocarbon fuels of this invention can be introduced into a burner with oxidizing gas (e.g., oxygen) to generate a flame for improved production yields of carbon nanomaterials. Alternatively, another hydrocarbon fuel, which can be a saturated hydrocarbon (e.g., methane); an unsaturated hydrocarbon; an aromatic hydrocarbon, other than a multiple-ring aromatic hydrocarbon (e.g., benzene); or mixtures thereof can be used alone or in combination with the multiple-ring aromatic hydrocarbon and the oxidizing gas to generate a flame. The heat generated by the flame is used for combustion or pyrolysis of the multiple-ring aromatic hydrocarbon fuel to generate improved yields of carbon nanomaterials. The multiple-ring aromatic hydrocarbon fuel may be introduced into or in the vicinity of an established flame where it is burned or pyrolyzed to generate carbon nanomaterials.

Multiple-ring aromatic hydrocarbon fuels preferred for use by introduction into premixed combustion burners or for introduction into an established flame are those that are substantially vaporized (i.e., sufficiently vaporized at the temperature of the burner to avoid clogging of the burner conduits) at the temperature of the burner. To accommodate multiple-ring aromatic hydrocarbon fuels with lower volatility, any premixing chambers or conduits for introduction of hydrocarbon fuel into the burner or into the flame can be heated to temperatures above the vaporization temperature of the fuel, accounting for the pressure of the system where the fuel is in the vapor state. Burners having cooled surfaces (i.e., water-cooled surfaces) are not preferred for use with the multiple-ring aromatic hydrocarbon fuels of this invention.

In preferred embodiments for low-cost production of fullerenes, the invention provides multiple-ring aromatic hydrocarbon fuels that are coal-tar distillate fractions and petroleum distillate fractions that contain one or more aromatic molecules having two or more six-member rings, five-member rings or both. Of particular use in low-cost production of fullerenes are coal-tar and petroleum distillate fractions containing a substantial amount of indene, one or more methylnapthalenes or combinations thereof. Fuels for low-cost production include coal-tar and petroleum distillate fractions that contain 40% or more or 50% or more by total weight of indene, one or more methylnapthalenes or combinations thereof.

Fuels for low-cost production also include petroleum solvent naphtha fractions, particularly those with boiling range (at about atmospheric pressure) of about 160° to about 210° C., and coal tar distillates containing one or more fractions collected over the temperature range (at about atmospheric pressure) of about 100° C. to about 220° C. and particularly coal tar distillates containing one or more fractions collected (at about atmospheric pressure) over the temperature range of about 120° C. to about 200° C.

Also preferred are hydrocarbon fuels containing indene, one or more methylnapthalenes or combinations thereof, particularly coal tar and petroleum distillates containing one or more of these components. Coal tar distillates containing one or more fractions collected (at about atmospheric pressure) over the temperature range of about 121°–196° C., particularly coal-tar solvent naphtha, are more preferred for use in the methods of this invention.

This invention provides a method for synthesis of fullerenes and other carbon nanomaterials comprising the steps of burning a multiple-ring aromatic hydrocarbon fuel which comprises one or more aromatic molecules containing two or more six-member rings, two or more five-member rings, or containing a mixture of one or more six member rings and one or more five-member rings, thereafter collecting condensables of the combustion containing carbon nanomaterials, including soot, and isolating carbon nanomaterials from the condensables.

Various combustion systems can be employed, but the best yields of fullerenes will occur when the system is operated at subambient pressure. In particular, a combustion system can be used which comprises a means for combustion of the multiple-ring aromatic hydrocarbon fuel such that soot containing carbon nanomaterials is generated and a means for collecting soot and other condensables (particularly those species condensing at temperatures up to about 350° C.) formed during or after fuel combustion. A useful combustion system comprises a burner for combustion of multiple-ring aromatic hydrocarbon fuel, particularly a burner for combustion of substantially vaporized multiple-ring aromatic hydrocarbon fuels, and a collector or trap for condensables generated during and/or after combustion. Another useful combustion system comprises a burner for generating a flame from a combination of a hydrocarbon fuel and an oxidizing gas (such as oxygen), a conduit or other means for introducing a multiple-ring aromatic hydrocarbon fuel into the already established flame or into the vicinity of the flame and a collector or trap for condensables generated during and/or after combustion of the fuels. The multiple-ring aromatic hydrocarbon fuel is introduced into or into the vicinity of an established flame such that the multiple-ring aromatic fuel is burned or pyrolyzed by heat generated in the flame.

Hydrocarbon fuels can, for example, be burned in a premixed flame or a diffusion flame, using a premixed burner or a diffusion burner, respectively. Preferred combustion systems and burners are typically those that generate higher amounts of carbon nanomaterials.

Condensables containing carbon nanomaterials, including fullerenes and/or fullerenic soot, can be trapped or collected using a variety of art-known techniques, e.g., by collection on surfaces that may include walls of the combustion system, nets, webbing or filters and which may be held at varying temperatures.

Hydrocarbon fuel is burned in the presence of oxidizing gas (such as oxygen, which may be provided in gas mixtures, e.g., air) such that a sooty flame is generated. The efficiency of soot and fullerene production and, more generally, carbon nanomaterial production can be affected by the relative amounts of fuels and oxidizing gas introduced into the burner. The equivalence ratio is one measure of fuel/oxidizer ratio in the burner.

The equivalence ratio ($\Phi$) is defined as:

$$\Phi = (\text{fuel/oxidizer})_{actual}/(\text{fuel/oxidizer})_{stoichiometric}$$

where the fuel to oxidizer ratios are molar ratios. An equivalence ratio greater than 1 means that excess fuel above stoichiometric is present. As referred to herein, the equivalence ratio is calculated from the actual (fuel/oxidizer) ratio measured at the inlet to the burner (or combustion system). In a combustion system useful in the present methods, the relative amounts of fuel to oxidizer introduced into the burner is controlled as desired by use of metering devices, particularly gas metering devices, such as metering valves.

Typically, an equivalence ratio of at least 2.2 is required to obtain carbon nanomaterials, including fullerenes. This ratio is also typically not larger than 4. The equivalence ratio is typically optimized empirically in a given combustion system for a given hydrocarbon to maximize the amount of a given carbon nanomaterial that is desired. For example, the equivalence ratio used in a process for synthesis of fullerenes can be optimized to generate the highest amount of solvent extractable fullerenes.

The fuel and oxidizing gas may be premixed before combustion (i.e., in a pre-mixed burner) or by mixing in the vicinity of the flame (e.g., as in a diffusion burner). For use with the lower volatility fuels of this invention (i.e., lower volatility compared to benzene or BTX), burner configurations in which the multiple-ring aromatic hydrocarbon fuel remains substantially in the vapor phase, for example, by heating fuel conduits to the burner, are employed. Hydrocarbon fuels can be volatilized by heating at higher than ambient pressures prior to their introduction into the burner.

Hydrocarbon fuel combustion is preferably carried out in a combustion system comprising at least one burner, at least one inlet into the burner for introduction of hydrocarbon fuel and oxidizing gas and a means for collecting condensable products of combustion (condensables). The inlet or inlets into the burner may be heated to facilitate transport of lower volatility hydrocarbon fuels. The burner is positioned within a housing for transport of condensables to a collector. An ignitor for initiation of a flame at the burner outlet (e.g., the burner plate) can be provided in the housing.

The housing of the combustion system can be in fluid communication with a pumping system for removing expended non-condensable gases from the system. The housing may be placed under vacuum and preferably the pressure in the housing containing the burner(s) is subatmospheric (more preferably the pressure in the housing is between about 20 to 70 Torr). The burner can be configured for premixing of hydrocarbon fuel and oxidizing gas (e.g., oxygen) or can be a diffusion burner.

Preferably the combustion system comprises a reaction zone downstream (as defined by gas and particulate flow from the burner to the collector and exhaust pumps) of the burner and flame. This region is insulated and typically heated by the flame, but may be provided with additional applied heat, to maintain a desired temperature (or temperature profile) over a selected distance from the burner plate. Further reaction, structural rearrangement or molecular condensation of species generated on combustion, including the formation of fullerenes and other carbon nanomaterials may occur in this region.

It has been found that increasing the residence time of combustion products at higher temperatures generally enhances the amount of fullerene formed. Condensable products (condensables) formed by combustion are collected downstream of the burner and preferably downstream of the heated zone. The fullerene content of soot collected, or more generally, the amount of other carbon nanomaterials in soot collected, the amount of soot collected and the overall carbon conversion yield of the combustion process may be affected by the distance from the burner outlet (e.g., the burner plate) at which condensables are collected.

A discussion of combustion systems useful for forming fullerenes is found in U.S. Pat. Nos. 5,273,729; 5,985,232 and 6,162,411 (Howard et al.). These patents generally describe combustion systems that are useful in the methods of this invention; however, these patents describe the use of a burner with a water-cooled burner plate. This type of burner is not preferred for use with multiple-ring aromatic hydrocarbon fuels of this invention.

A burner configuration preferred for use with multiple-ring aromatic hydrocarbon fuels of this invention is described in concurrently filed regular utility U.S. application, Attorney Docket No. 85-01, and U.S. provisional application No. 60/316,426 filed Aug. 30, 2001. These applications also describe combustion systems useful for synthesis of fullerenes and other carbon nanomaterials in more detail.

A variety of traps or collectors for condensables and/or soot are known in the art. In general, a surface, such as a wall of the combustion system, may be used for collection. Alternatively, a filtering system for collection of soot particles (and species adsorbed thereon) can be provided. Preferably a filter with pore sizes less than about 10 micron is employed. Periodic clearing of the collection surfaces of filters is required for continued operation of the reactor system. Concurrently filed U.S. patent application, Attorney Docket No. 91–01 and U.S. provisional application No. 60/316,315, filed Aug. 30, 2001, provide a description of preferred filter devices with in situ cleaning mechanisms for collection of condensables.

Condensables including soot can be collected at varying distances from the burner flame. Since formation of fullerenes and other carbon nanomaterials can continue in a post-flame zone, yield can depend upon the location of collectors. In typical combustion production systems, condensables are collected when the gas temperature has dropped below about 600° C. Condensables including soot can be collected on metal surfaces and in or on various types of filters.

Solvent extractable fullerenes, particularly $C_{60}$ and $C_{70}$, are isolated by solvent extraction of collected condensables typically using toluene, xylene or mixtures thereof as extraction solvents. Fullerene yield measured as percent carbon conversion into extractable fullerenes is determined by HPLC (high performance liquid chromatography) analysis of the condensables; when combined with the total weight of the condensables, the total amount of extractable fullerenes is attained. Diener, M. D. et al. (2000) J. Phys. Chem B 104:9615 provides a more detailed description of the measurement of fullerene yield using HPLC methods.

It may be desirable to purify fullerenes, fullerenic soot, or other carbon nanomaterials, in particular, it may be desirable to remove polynuclear aromatic hydrocarbons (PAHs) from fullerenes, fullerenic soot or other carbon nanomaterials. Any method known in the art for purification of fullerenes, fullerenic soot or other carbon nanomaterials or enrichment of these materials in collected product can be employed in the methods of this invention. A preferred method for removing undesired PAHs is provided in U.S. provisional patent application No. 60/316,315, filed Aug. 30, 2001.

The combustion methods of this invention employing multiple-ring aromatic hydrocarbon fuels having one or more aromatic molecules which contain two or more rings provide significantly higher carbon conversion yields (at least about 25% higher conversion and preferably 50% or more higher conversion) compared to those observed using benzene, a single-ring aromatic fuel, in similar combustion systems. In particular, the methods of this invention can generate extractable fullerenes at carbon conversion rates of at least about 0.5%. In preferred methods, combustion of multiple-ring aromatic hydrocarbon fuels of this invention can exhibit carbon conversion rates for extractable fullerenes of about 1.0% or more.

The use of multiple-ring aromatic hydrocarbon fuels of this invention comprising one or more aromatic molecules containing two or more six-member rings, two or more five-member rings or a mixture of one or more six-member rings and one or more five-member rings is particularly beneficial for the production of fullerenes at high production rates, particularly at rates greater than about 100 g fullerenes/day.

DETAILED DESCRIPTION OF THE INVENTION

This invention is based at least in part on the discovery that the yield of fullerene synthesis from flame combustion is dramatically improved by employing multiple-ring aromatic hydrocarbon fuels or feedstock particularly those containing polynuclear aromatic hydrocarbons. Most combustion methods have focused on generation of fullerenes in sooting benzene flames. Although up to about 20% by weight of extractable fullerenes has been recovered from soot of benzene combustion, the yield of fullerenes expressed as total conversion of hydrocarbon feedstock carbon (benzene carbon) to solvent-extractable fullerene carbon is only about 0.5%. Applicants' efforts have demonstrated that benzene is not the optimum hydrocarbon for combustion synthesis of fullerenes. They have obtained fullerene yields that are dramatically improved (50–100%) by using hydrocarbon feeds containing PAHs.

Specifically, middle fractions of coal tar distillates (CTDs) preferably those containing fractions collected at ambient pressures at temperatures ranging from about 100° C. to 220° C. have been identified as highly desirable feedstocks for this synthesis. These low cost coal tar fractions provide a mixture of PAHs with two or more rings, the use of which provide improved yields of extractable fullerenes in combustion methods. In addition, use of these coal tar distillates requires fewer safety restrictions in comparison to the use of benzene. The CTDs employed in this work contain low levels of N, S and O and other elements other than carbon and hydrogen. The results herein also demonstrate that fullerenes can be readily formed in high yield from industrial mixtures of hydrocarbons, even when atoms besides carbon and hydrogen are present in the feedstock.

It is believed that the formation of fullerenes and other carbon nanomaterials from hydrocarbons in the gas phase proceeds through PAHs (Homann (1998) Angew. Chem. Int. Ed. 37:2434). Fullerenes are the thermodynamically favored carbon product of a rich flame at low pressure in the temperature range ca. 1200°–1600° C. (They are however, not the kinetically favored product, as a fast reaction rate, primarily condensation of acetylenic species, leads to giant PAHs and soot.). PAHs can be formed in rich aliphatic fuel flames, but the time to form the first ring is slow, and fullerene yield is poor from aliphatic fuels in comparison to aromatic fuels (Howard et al., 1992), where the first ring is already formed.

Without wishing to be bound by any particular theory, it is believed that using an aromatic hydrocarbon with more than one ring in a fuel, such as a fuel containing PAHs, for production of carbon nanomaterials starts the condensation process in the flame further along the pathway to fullerenes and other carbon nanomaterials resulting in a higher total conversion of fuel carbon to fullerenes and other carbon nanomaterials. The process using PAHs is, however, also further along the pathway to soot formation, so that more soot is formed on combustion of fuels containing PAHs. Because of increased soot formation with PAHs, the % recoverable fullerenes in the soot of a PAH flame is similar to that of a comparable single-ring aromatic flame. The advantage of using fuels that primarily contain multiple ring aromatic molecules is that the overall fullerene formation rate from the fuel is increased. Thus, fuels containing one or more aromatic molecules containing two or more six-member rings, two or more five-member rings or combinations of one or more six-member rings and one or more five-member rings are preferred for more efficient and lower-cost large scale fullerene production.

The methods of this invention can be used to prepare fullerenes, including solvent extractable fullerenes, and more generally to prepare fullerenic soot and other carbon nanomaterials.

The multiple-ring aromatic hydrocarbon fuels of this invention which exhibit increased total carbon conversion yields to fullerenes contain at least one aromatic molecule that contains at least two six-member rings, at least two five-member rings or a mixture of one or more six-member rings and one or more five-member rings. Aromatic molecules useful as components of the fuels of this invention include, for example, those molecules containing one aromatic six-member ring and a saturated or unsaturated six-member ring or five-member ring, for example, indene and indan; those molecules containing two aromatic rings, such as naphthalenes or methylnaphthalenes; and those molecules containing three aromatic rings, such as anthracene and phenanthrene.

Polynuclear aromatic hydrocarbons (also polycyclic aromatic hydrocarbons, PAHs) are aromatic species containing at least two rings. PAHs include, among others, indene, methyl indenes, naphthalenes, methylnaphthalenes, biphenyls, quinolines, phenanthrenes, anthracenes, alkyanthracenes fluoroanthenes, pyrenes and perylenes. The term PAH is used broadly herein to encompass any aromatic species containing at least two rings wherein the rings contain carbons or wherein the rings may contain one or more heteroatoms (e.g., O, N or S). One or more of the $CH_2$ groups in the PAH may be replaced with a C=O group. PAH's contain at least one aromatic ring and at least one other ring which may be saturated, unsaturated or aromatic. One or more of the aromatic, saturated or unsaturated rings of a PAH may be heterocyclic. One or more of the rings of a PAH can be substituted with an alkyl group, or an OH group.

The term "aromatic" as used herein in reference to components (or molecules) and to rings (of carbons or of carbons in combination with one or more heteroatoms) takes its well-known meaning in the art and is intended to encompass any planar ring containing 4n+2Π electrons (where n=0, 1, 2, 3, etc.) and any molecule which contains at least one aromatic ring. Aromatic rings derive additional stabilization from the delocalization of Π electrons. Examples of aromatic molecules include benzene, naphthalene, substituted benzenes (e.g., toluene) and substituted naphthalenes, pyridine, indane, indene, pyrrole, furan, and thiophene. In the aromatic hydrocarbon fuels of this invention two or more aromatic, unsaturated or saturated rings carbon or heterocyclic rings can be fused to each other or can be linked via a linear or branched hydrocarbon.

In specific embodiments, hydrocarbon fuels of this invention can contain one or more of the following aromatic or heterocyclic compounds in addition to one or more polynuclear aromatic hydrocarbon compounds:

Benzene, ethylbenzene, toluene, ethyltoluene, vinyltoluene, 1,2,4-methylbenzene, mesitylene, p-cresol, cresol, xylene, pyrrole, 3-pyrroline, pyrrolidine, thiophene, pyridine, pyridizine, pyrazine, pyrimidine, methylthiophene, methylpyrazine, 1-methylpyrrole, 3-methylpyridazine, 1-methylpyrrolidine, 2-methylpyrrolidine, indazole, indole, indoline, furan, and styrene.

In such compositions, the PAHs or mixture thereof are present in a substantial amount (30% by weight or more).

In a specific embodiment the hydrocarbon fuels of this invention can contain a substantial amount of indene in combination with one or more of the following:

Benzene, ethylbenzene, toluene, ethyltoluene, vinyltoluene, 1,2,4-methylbenzene, mesitylene, p-cresol, cresol, xylene, pyrrole, 3-pyrroline, pyrrolidine, thiophene, pyridine, pyridizine, pyrazine, pyrimidine, methylthiophene, methylpyrazine, 1-methylpyrrole, 3-methylpyridazine, 1-methylpyrrolidine, 2-methylpyrrolidine, indazole, indole, indoline, furan, naphthalene, methylnaphthalene, indan, methylindene, phenanthrene, anthracene, pyrene, chrysene and styrene.

In a preferred embodiment of this invention, the multiple-ring aromatic hydrocarbon fuel is a coal tar distillate (CTD). CTDs are produced by heating coal to remove the volatile components which are condensed and collected. As such, significant quantities of nitrogen, oxygen and sulfur can be present in the distillate, for example, in the form of heterocyclic components. Each fraction of CTD is, however, a mixture of many different aromatic molecules, and a significant part of any particular faction cannot be identified. Certain fractions of CTD may, however, contain a predominant single component present in the fraction in a substantial amount. (The term substantial amount as used herein to refer to components in hydrocarbon fuels or CTD fraction means about 30% by weight or more of the fuel or CTD fraction.)

There can be significant variation in composition of CTDs from different commercial sources. The variation mainly results because each coal tar distillery takes different cuts (collects over different temperature ranges), resulting in different mixtures. For example, one distillery may collect three separate fractions over a given temperature range, while another distillery collects five separate fractions over the same temperature range. Finally, the type of coal that is distilled can lead to some variation in relative amounts of volatiles for each cut of each distillery. Despite all of the variability in CTDs that may be currently available, they are valuable for fullerene formation because of their low cost and high yield. CTDs also encompass any fractions collected over any subdivided range of temperatures over which fractions are normally collected for commercial products as well as mixtures of commercially available CTD fractions.

Another source of hydrocarbon fuels useful in low-cost combustion production of fullerenes and other carbon nanomaterials are petroleum tank bottoms and petroleum distillate fractions that contain one or more aromatic molecules that contain two or more six-member rings, two or more five-member rings or that contain a mixture of one or more six-member rings and one or more five member rings. Of particular interest are petroleum bottoms or fractions that contain a substantial amount of two-ring PAHs.

In another embodiment, petroleum distillates and fuels containing 25% or more by weight of one or more aromatic components are useful as hydrocarbon fuel in the present invention. A particularly useful petroleum product is Vacuum Gas Oil (VGO), which predominantly comprises 3 and 4 ring PAHs and heterocycles, along with some polar organics. Petroleum distillate containing fractions collected over the range of about 150°–220° C. are generally useful as hydrocarbon fuel in the method of the present invention. A more preferred petroleum distillate contains fractions collected over the range of 160°–210° C.

Two types of petroleum solvent naphtha are commercially available, corresponding to the two lightest fractions of coal tar distillate. One has a boiling point range of 320° F.–350° F. (160° C.–177° C.). The other has a boiling point range of ca. 360° F.–410° F. (182° C.–210° C.) and is generally similar in content to the coal tar distillates collected over the same boiling range (the indene and naphthalene fractions). Often benzene is removed from these fractions. The petroleum fractions will have more paraffins and as a result will be slightly less expensive than corresponding coal tar fractions. Of particular interest in the methods of this invention to provide enhanced yield of fullerenes is petroleum solvent naphtha with a boiling range of ca. about 360° F.–410° F. (182° C.–210° C.).

Those of ordinary skill in the art will further appreciate that CTD fractions can be combined with one another or with petroleum distillate fractions to achieve compositions useful in the combustion methods herein. Furthermore CTDs or petroleum fractions can be combined with, or diluted with, single-ring or two ring aromatic compounds to prepare hydrocarbon fuels of this invention. For example, the CTDs or petroleum fractions can be combined or diluted with benzene, indene, or naphthalenes, among others. The efficacy of any mixture will be related to its aromatic content (i.e., the amount of aromatic components present), with a preference for PAHs, particularly indene and methyl naphthalenes, over single-ring aromatic hydrocarbons or heterocycles.

The fraction of CTD or petroleum distillate preferred for use for combustion synthesis depends on the burner type used. For example in a premixed burner where the fuel is in a vapor state, a relatively lightweight fraction, such as Koppers Industries' Solvent Naphtha fraction (ca. 50% indene) is the most convenient to handle. However, hydrocarbon fuels of this invention which contain PAHs, or more generally fuels which contain one or more aromatic components that contain two or more six-member rings, two or more five-member rings or a six-member ring and a five-member ring are not preferred for use with burners in which the burner surface is cooled.

As can be seen from the following section, the heteroatoms (nitrogen, oxygen and sulfur) invariably present in CTD do not impair fullerene formation and the solvent-extraction procedures developed for the separation of fullerenes from soot can be performed on combustion soot produced by the methods of this invention without modification.

Combustion systems for generation of fullerenes are known in the art. These systems typically comprise a burner, conduits for introduction of hydrocarbon fuel(s)and oxidizing gas into the burner, optionally conduits for introduction of multiple-ring aromatic hydrocarbon fuels into or into the vicinity of an established flame, a collector or filter device for collection of carbon nanomaterials (including fullerenes) and also including soot (including fullerenic soot) produced by combustion. Product gas flow from the burner outlet is pumped from the system past the collector or through the filter. The combustion system preferably has a post-burner reaction zone prior to collection of products. An exemplary combustion system for production of carbon nanomaterials is described in U.S. provision application Ser. No. 60/316,426, filed Aug. 30, 2001, and concurrently filed U.S. patent application, Attorney Docket No. 85-01.

The invention relates to fuels for generating carbon nanomaterials employing combustion in flames, particularly in sooting flames. The term "combustion" is used herein to refer to the exothermic reaction of a hydrocarbon or mixture of hydrocarbons with oxygen (or an other oxidizing gas) without limitation to any particular reactant stoichiometry to produce products in addition to $CO_2$ and $H_2O$. Heat generated by the combustion of one hydrocarbon or mixture of hydrocarbons can be used to facilitate combustion of another hydrocarbon or hydrocarbon mixture. The term "burning" of hydrocarbon in oxygen or other oxidizing gas is intended to have the same meaning as combustion herein. Both terms are intended broadly to also encompass combustion initiated pyrolysis of hydrocarbons. Pyrolysis is the decomposition of a material, such as a hydrocarbon, by heat in the absence of oxygen and in combustion initiated pyrolysis heat for pyrolysis is generated, at least in part, by combustion of hydrocarbon. In general in combustion initiated pyrolysis, the combustion of one hydrocarbon or hydrocarbon mixture can be used to generate heat which pyrolyzes another hydrocarbon or hydrocarbon mixture.

Fullerenes and other carbon nanomaterials are typically produced in sooty flames by burning of the hydrocarbon fuel. Hydrocarbon fuels can be introduced into the burner substantially in the vapor state (substantially entirely vaporized) in combination with an oxidizing gas to generate a flame. Alternatively, multiple-ring aromatic hydrocarbon fuels can be introduced into or into the vicinity of an established flame, rather than passing through the burner, such that the multiple-ring aromatic hydrocarbon fuel is decomposed by the heat generated by the flame. When using lower volatility hydrocarbon fuels, conduits for delivery of the fuel to the burner or the flame may be heated to prevent condensation of the fuel in the burner. It may be beneficial to volatilize the lower volatility fuels of this invention prior to their introduction into the burner or the flame. Various methods to volatilize hydrocarbons are known in the art, for example, the fuels may be heated at elevated pressure to a temperature at which they are substantially entirely volatilized.

The multiple-ring aromatic hydrocarbon fuels of this invention can also be employed in the synthesis of fullerenes and other carbon nanomaterials in combustion systems that are designed to burn liquid hydrocarbon fuels in the presence of oxygen. One such system is described in U.S. provisional application No. 60/337,750 filed Dec. 5, 2001.

Under optimized conditions, about 20% of the solid carbon product of benzene combustion (soot+fullerenes) is extractable into toluene or xylene as fullerenes. The overall yield, however, must also take into account the rate of carbon solid (soot) formation. Since different burners and combustion systems have different soot production rates, the best yield comparison of different hydrocarbon fuels should be performed on the same burner. Table 1 provides data comparing yield of a multiple-ring aromatic hydrocarbon fuel of this invention with benzene in two different burner designs; one with a diffusion flame where the gases mix slightly above the burner surface, the other with a larger premixed burner.

Benzene combustion was compared to combustion of a commercially-available lightweight CTD fraction (Solvent Grade Coal Tar Naphtha, obtained from Koppers Industries). The solvent naphtha fraction of coal tar distillate is collected over the range 121° C.–196° C., and contains a variety of molecules (see analysis in Table 2). As indicated in Table 2, this distillate fraction contains about 50% by weight indene. The particular fraction used for our example was analyzed to contain 89.91/7.85/1.82/0.11% C/H/N/S (with a C:H ratio of about 11.5).

Soot collected from the combustion system was analyzed by identical extraction methods for all operations: Total fullerenes were determined by an HPLC analysis. The soot was collected and weighed. Solvent (5.0 ml o-xylene) was added to about 10 mg of soot immediately after collection. The mixture was then sonicated for one minute, followed by filtration through a 0.45 micron Teflon filter. The filtrate was then injected into an HPLC. The HPLC had been previously calibrated by measuring the absorbance at 308 nm from a series of standards created by varying the weight of purified mixed fullerene extract added to known volumes of o-xylene. The column in the HPLC was C18 reverse phase silica. The mobile phase was a 60:40 toluene:methanol mixture. The filtered fullerene solution (10 microliters) was injected into the HPLC and the absorbance of the colunm eluent was monitored at 308 nm. The HPLC peak areas for all fullerenes were totaled and compared to the areas of a calibration sample of mixed fullerenes. The HPLC analysis gives the % extractable fullerenes in the soot. Multiplying the % extractable fullerenes in the soot by the soot weight gives the total weight of fullerenes produced.

Fullerenes and fullerenic soot are collected as condensable products of combustion. Condensable products contain soot, fullerenes and other carbon nanomaterials including products of combustion that may have rearranged or condensed with other combustion products in the post-burner reaction zone. Condensable products may also contain polynuclear aromatic hydrocarbons, from the fuel or which are generated on combustion. As discussed briefly herein the presence of PAHs in fullerenes and fullerenic soot is not desirable and PAHs are preferably removed from isolated fullerenes, fullerenic soot or other carbon nanomaterials.

Condensables are any products of combustion (or remnants of hydrocarbon fuel) released at the burner which can be collected on a surface at temperatures from ambient up to 350° C. Condensables are distinguished from gaseous products, such as CO or $CO_2$, which may be released by the burner and from volatile components such as benzene, toluene, etc.

The results of Table 1 demonstrate a dramatic increase in overall carbon conversion to extractable fullerenes when the CTD fraction is employed as the hydrocarbon fuel compared to both benzene and toluene. These results also demonstrate a significant improvement over the prior art, where reported overall carbon conversion of benzene to extractable fullerenes was reported to be 0.5% (Howard et al., 1992).

TABLE 1

Comparison of fuels for fullerene combustion synthesis

| Fuel | Burner | Mass soot collected/ mass carbon consumed | % extractable fullerenes | Overall carbon conversion, % |
|---|---|---|---|---|
| Benzene | Diffusion[1] | 0.033 | 11.4 | 0.38 |
| Solvent Naphtha | Diffusion[1] | 0.082 | 9.0 | 0.74 |
| Toluene | Premixed[2] | 0.048 | 18 | 0.86 |
| Solvent Naphtha | Premixed[2] | 0.066 | 19 | 1.3 |

[1]Mini combustion burner; Optimized conditions: 30 Torr, 15 ml/min fuel feed for both. Φ (benzene) = 2.3; Φ (naphtha) = 2.9;
[2]Premixed burner; Optimized conditions: 40 Torr, 80 ml/min fuel feed for both. Φ (toluene) = 3.0; Φ (naphtha) = 3.4, where Φ is the equivalence ratio.

The equivalence ratios employed to obtain the data in Table 1 were empirically optimized to maximize extractable fullerenes in preliminary runs in the same combustion system with all other reactor conditions held constant. Optimized equivalence ratios were different for different hydrocarbon fuels and different for the same fuel in different combustion systems. The differences observed in overall carbon conversion did not result from differences in equivalence ratio and were attributable to the type of fuel employed.

TABLE 2

Results Of Gas Chromatographic Analysis Of Solvent Grade Coal Tar Naphtha (Koppers Industries)[1]

| COMPONENT | % BY WEIGHT | RANGE[2,3,4] (% by WEIGHT) |
|---|---|---|
| Benzene | 3.5 | 3.0, 6.1 (1–5) |
| Toluene | 4.3 | 5.0, 5.7 (2–6) |
| Ethylbenzenes | 0.8 | –, 1.0 |
| Xylenes | 5.2 | 7.3, 7.8 (3–10) |
| Phenol | 1.9 | 1.6, – |
| 2,3-Benzofuran | 3.3 | <0.1, – |
| Indan | 5.3 | 5.9, 4.2 |
| Indene | 50.1 | 47, 48, (45–50) |
| Creosoles | 2.1 | 0.3, – |
| Naphthalene | 7.4 | 2.0, 2.6 (1–5) |
| Styrene | 2.4 | –, 3.6 |
| TOTAL | 86.3 | NA[5] |

[1]This is an analysis of a sample of Koppers Solvent Grade Coal Tar Naphtha (CAS Number 65996-79-4).
[2]The amounts of individual components of the mixture may vary from batch to batch. Ranges listed for certain components are from analyses of different batches of the same material.
[3]The ranges listed in parenthesis for certain components are from a Koppers Industries MSD Sheet for Solvent Naphtha fraction dated 1998. These ranges should be considered to be approximate.
[4]Quinolin, ethyltoluene, trimethylbenzenes, vinyltoluene, coumarone, methyl indenes, and tetralin may also be present in a given batch.
[5]Not Applicable The improvements in combustion synthesis of this invention by selection of hydrocarbon fuel to contain substantial amounts of PAHs is useful for the formation of fullerenes, fullerenic soot and other carbon nanomaterials. The use of PAHs, particularly indene, in the combustion process for fullerene production increases the rate of production and reduces production cost. Sooting flames are the most cost-effective manner to produce fullerenes at large production rates (greater than roughly 100 g/day). Fullerenes, other carbon nanomaterials and the combustion soot containing these materials have a wide variety of potential applications, e.g. additives to electron- and photo-resists for semiconductor processing, in cosmetics, antioxidants, anti-viral agents, etc. All of these applications are price-sensitive, and cost-effective use of carbon nanomaterials in these applications requires that they be available at significantly lower production cost than is currently available. The use of the hydrocarbon fuels of this invention, particularly coal-tar distillate fractions containing indene, in combustion processes can halve the cost of production of fullerenes.

Those of ordinary skill in the art will appreciate that fuel components, device elements, procedures, processing conditions and techniques, including specific burner designs, combustion reactor designs and burner temperatures, combustion system pressures, methods of collection of condensables and purification processes, other than those that are specifically illustrated herein can be employed in the practice of this invention as claimed without resort to undue experimentation. Those of ordinary skill in the art will recognize and understand that functional equivalents of fuel compositions, device elements, procedures, processing conditions and techniques illustrated herein exist in the art. All such known functional equivalents are intended to be encompassed by this invention.

All references cited herein are incorporated by reference herein to the extent that they are not inconsistent with the descriptions herein.

We claim:

1. A method for making fullerenes or other carbon nanomaterials which comprises the steps of:
    (a) burning a multiple-ring aromatic hydrocarbon fuel comprising indene; and
    (b) collecting condensables containing carbon nanomaterials produced by burning the multiple-ring aromatic hydrocarbon fuel.

2. The method of claim 1 wherein the multiple-ring aromatic hydrocarbon fuel comprises 30% or more by weight of indene.

3. The method of claim 1 wherein the multiple-ring aromatic hydrocarbon fuel comprises 40% or more by weight of indene.

4. The method of claim 1 wherein the multiple-ring aromatic hydrocarbon fuel comprises 50% or more by weight of indene.

5. The method of claim 1 wherein the multiple-ring aromatic hydrocarbon fuel comprises a mixture of indene with single ring aromatic molecules.

6. The method of claim 5 wherein the single ring aromatic molecules are benzene, toluene, xylene, or trimethylbenzene.

7. The method of claim 1 wherein the multiple-ring aromatic hydrocarbon fuel comprises a mixture of indene and aromatic molecules comprising two rings.

8. The method of claim 7 wherein the aromatic molecules comprising two rings are naphthalene or methylnaphthalene.

9. The method of claim 1 wherein the multiple-ring aromatic hydrocarbon fuel comprises a mixture of indene and naphthalene.

10. The method of claim 1 wherein the multiple-ring aromatic hydrocarbon fuel comprises a mixture of aromatic molecules having one, two or three aromatic rings.

11. The method of claim 10 wherein indene is present in the multiple-ring aromatic hydrocarbon fuel in an amount of about 30% or more by weight.

12. The method of claim 10 wherein indene is present in the multiple-ring aromatic hydrocarbon in an amount of about 40% or more by weight.

13. The method of claim 10 wherein indene is present in the multiple-ring aromatic hydrocarbon fuel in an amount of about 50% or more by weight.

14. The method of claim 1 wherein the multiple-ring aromatic hydrocarbon fuel is a coal tar distillate comprising indene.

15. The method of claim 14 wherein the coal tar distillate comprises about 30% or more by weight of indene.

16. The method of claim 14 wherein the coal tar distillate comprises about 40% or more by weight of indene.

17. The method of claim 14 wherein the coal tar distillate comprises about 50% or more by weight of indene.

18. The method of claim 1 wherein the multiple-ring aromatic hydrocarbon fuel is a liquid at room temperature and about atmospheric pressure.

19. The method of claim 1 wherein fullerenes are isolated from the condensables.

20. The method of claim 1 wherein the multiple-ring aromatic fuel further comprises naphthalenes.

21. The method of claim 1 wherein the multiple-ring aromatic fuel further comprises methylnaphthalenes.

22. A method for making fullerenes which comprises the steps of:
    (a) burning a multiple-ring aromatic hydrocarbon fuel which comprises at least one component that is an aromatic molecule which comprises two or more six-member rings, two or more five-member rings or a mixture of one or more six-member rings and one or more five member rings; wherein the multiple-ring aromatic hydrocarbon fuel comprises a mixture of aromatic molecules having one, two or three aromatic rings; and
    (b) collecting condensables containing fullerenes produced by burning the multiple-ring aromatic hydrocarbon fuel.

23. The method of claim 22 wherein the multiple-ring aromatic hydrocarbon fuel is a petroleum distillate.

24. The method of claim 23 wherein the petroleum distillate comprises one or more fractions collected over the range of temperatures from about 150° C.–220° C. at about atmospheric pressure.

25. The method of claim 23 wherein the petroleum distillate comprises one or more fractions collected over the range of temperatures from about 182° C. to 210° C. at about atmospheric pressure.

26. The method of claim 23 wherein the petroleum distillate comprises one or more fractions collected over the range of temperatures from about 160° to 177° C.

27. The method of claim 23 wherein the petroleum distillate comprises at least about 30% PAHs having two or more rings.

28. A method for making fullerenes or other carbon nanomaterials which comprises the steps of:
    (a) burning a multiple-ring aromatic hydrocarbon fuel which comprises at least one component that is an aromatic molecule which comprises two or more six-member rings, two or more five-member rings or one or more six-member rings and one or more five-member rings; and
    (b) collecting condensables containing carbon nanomaterials produced by burning the multiple-ring aromatic hydrocarbon fuel wherein the C:H weight ratio of the multiple-ring aromatic fuel is between about 10:1 and about 20:1.

29. The method of claim 28 wherein the C:H weight ratio of the multiple-ring aromatic fuel is between about 10:1 and about 15:1.

30. The method of claim 28 wherein fullerenes are isolated from the condensables.

31. The method of claim 28 wherein the multiple-ring aromatic fuel is a coal tar distallate.

32. The method of claim 28 wherein the multiple-ring aromatic fuel is a petroleum distallate.

33. The method of claim 28 wherein the multiple-ring aromatic fuel is a vacuum gas oil.

34. The method of claim 28 wherein the multiple-ring aromatic hydrocarbon fuel is a coal tar distallate.

35. The method of claim 34 wherein the coal tar distillate comprises fractions collected over the range of temperatures from about 100° C. to about 220° C. at about atmospheric pressure.

36. The method of claim 34 wherein the coal tar distillate comprises one or more fractions collected over the range of temperatures from about 120° C. to about 200° C. at about atmospheric pressure.

37. The method of claim 34 wherein the coal tar distillate consists essentially of one or more fractions collected over the range of temperatures from about 100° C. to about 220° C. at about atmospheric pressure.

38. The method of claim 34 wherein the coal tar distillate consists essentially of one or more fractions collected over the range of temperatures from about 120° C. to about 200° C. at about atmospheric pressure.

39. The method of claim 34 wherein the coal tar distillate is a mixture of fractions collected over the range of temperatures from about 100° C. to about 220° C. at about atmospheric pressure.

40. The method of claim 34 wherein the coal tar distillate is a mixture of fractions collected over the range of temperatures from about 120° C. to about 200° C. at about atmospheric pressure.

41. A method for making fullerenes which comprises the steps of:
  (a) burning a multiple-ring aromatic hydrocarbon fuel which comprises at least one component that is an aromatic molecule which comprises two or more six-member rings, two or more five-member rings, or one or more six-member rings and one or more five member rings; and
  (b) collecting condensables containing fullerenes produced by burning the multiple-ring aromatic hydrocarbon fuel;
  wherein the multiple-ring aromatic hydrocarbon fuel is a liquid at room temperature and about atmospheric pressure.

42. The method of claim 41 wherein the condensables collected contain at least about 10% by weight of solvent extractable fullerenes.

43. A method for making fullerenes which comprises the steps of:
  (a) burning a multiple-ring aromatic hydrocarbon fuel which comprises at least one component that is an aromatic molecule which comprises two or more six-member rings, two or more five-member rings or a mixture of one or more six-member rings and one or more five member rings; wherein the multiple-ring aromatic hydrocarbon fuel is a mixture of aromatic molecules having two or three rings and wherein the multiple-ring aromatic hydrocarbon fuel is a liquid at room temperature and about atmospheric pressure; and
  (b) collecting condensables containing fullerenes produced by burning the multiple-ring aromatic hydrocarbon fuel.

44. A method for making fullerenes which comprises the steps of:
  (a) burning a multiple-ring aromatic hydrocarbon fuel which comprises at least one component that is an aromatic molecule which comprises two or more six-member rings, two or more five-member rings, or one or more six-member rings and one or more five member rings; and
  (b) collecting condensables containing fullerenes produced by burning the multiple-ring aromatic hydrocarbon fuel;
  wherein the multiple-ring aromatic hydrocarbon fuel is a vacuum gas oil.

* * * * *

UNITED STATES PATENT AND TRADEMARK OFFICE
CERTIFICATE OF CORRECTION

PATENT NO. : 7,150,863 B2 Page 1 of 1
APPLICATION NO. : 10/099095
DATED : December 19, 2006
INVENTOR(S) : Alford et al.

It is certified that error appears in the above-identified patent and that said Letters Patent is hereby corrected as shown below:

IN THE CLAIMS:

Claim 32
Column 16, line 46, replace "distallate" with --distillate--.

Signed and Sealed this

Thirteenth Day of March, 2007

JON W. DUDAS
*Director of the United States Patent and Trademark Office*